Figure 1:
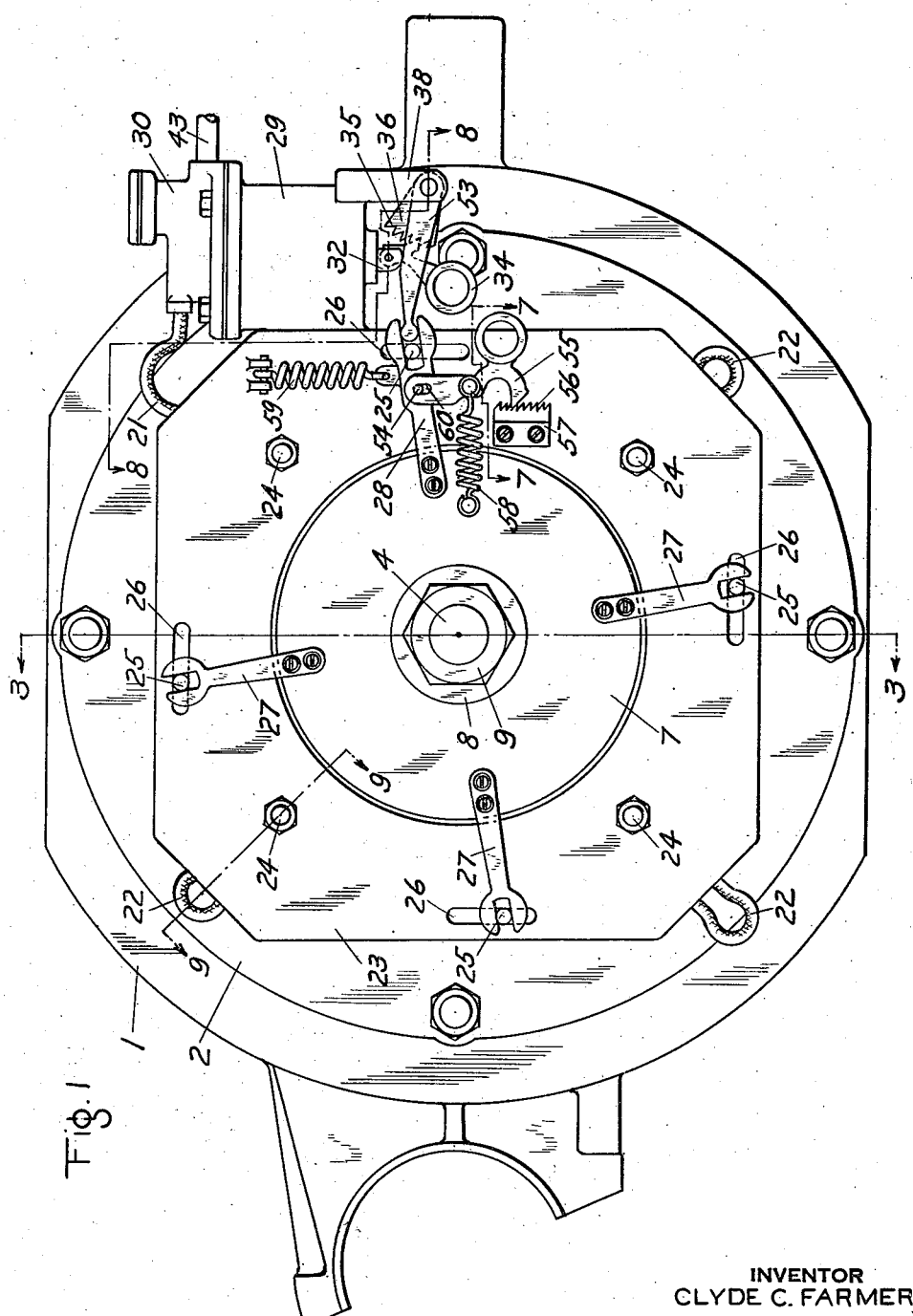

March 28, 1939.  C. C. FARMER  2,151,843
FRICTION BRAKE
Filed April 17, 1936  3 Sheets-Sheet 1

INVENTOR
CLYDE C. FARMER
BY Wm. M. Cody
ATTORNEY

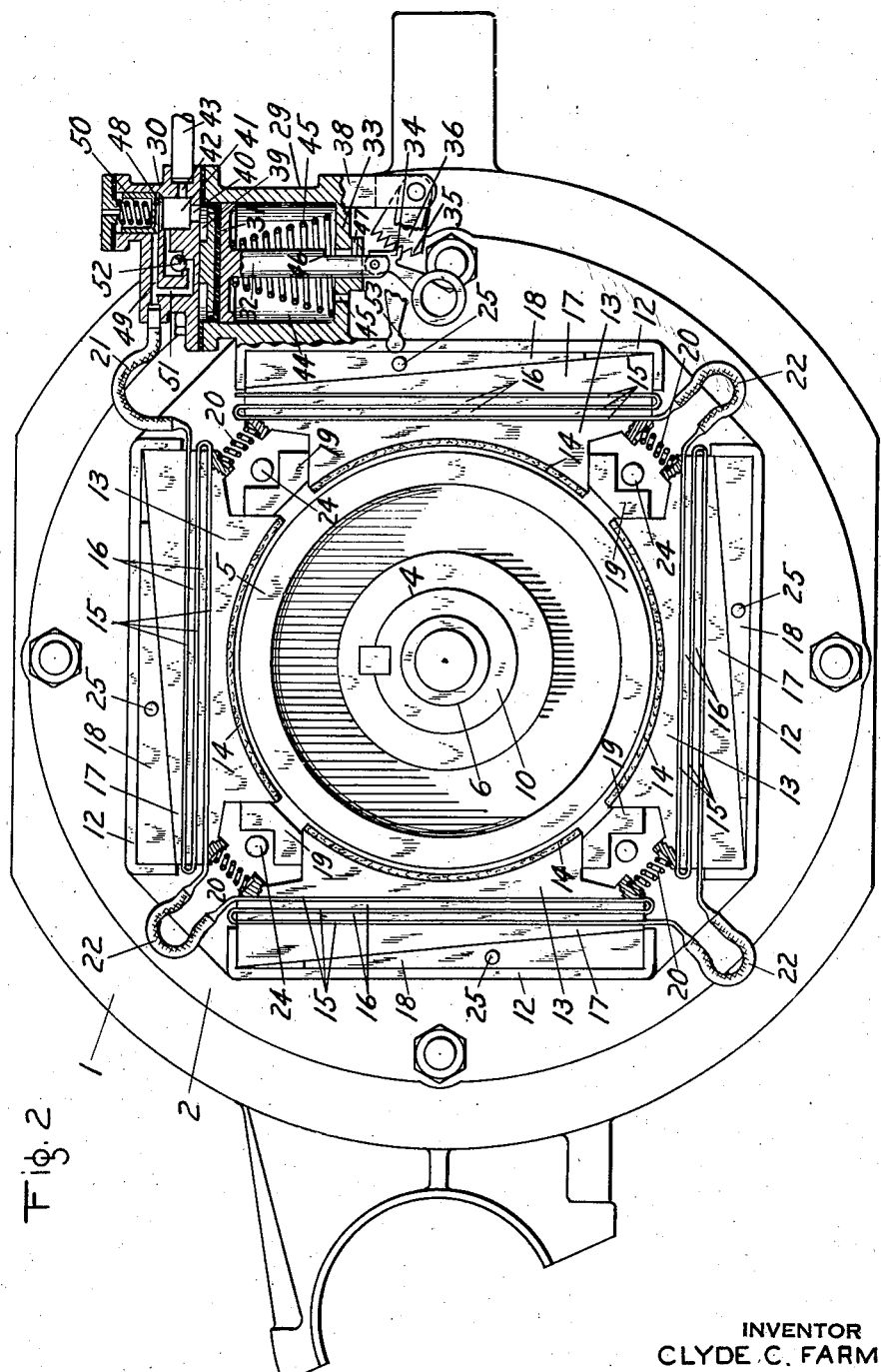

March 28, 1939. C. C. FARMER 2,151,843
FRICTION BRAKE
Filed April 17, 1936 3 Sheets-Sheet 3
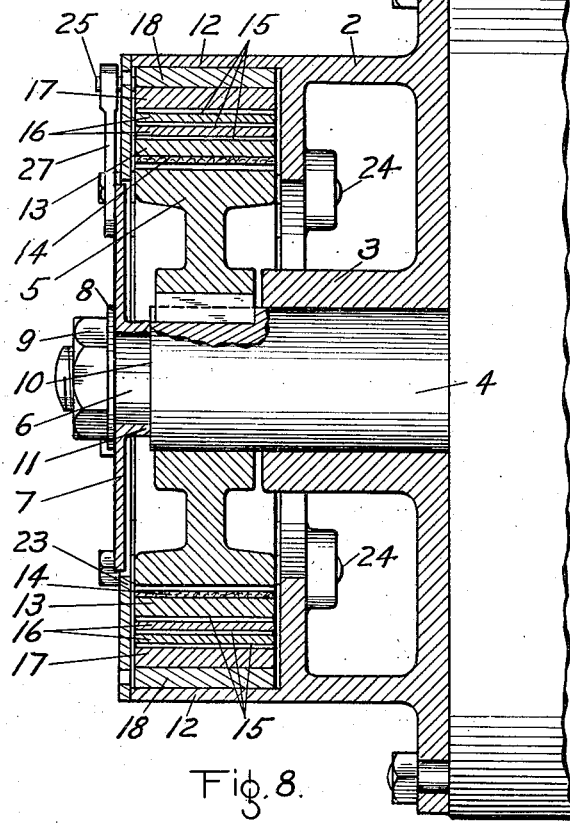
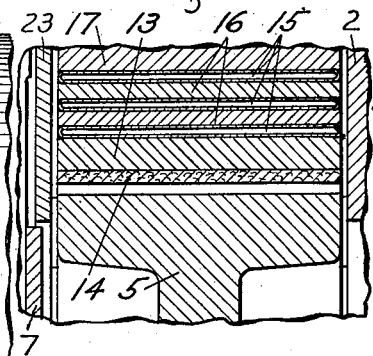
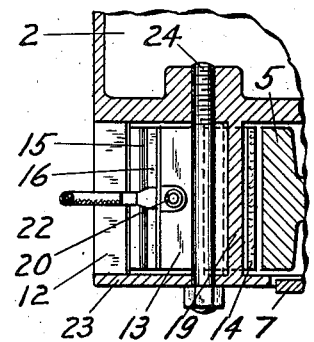
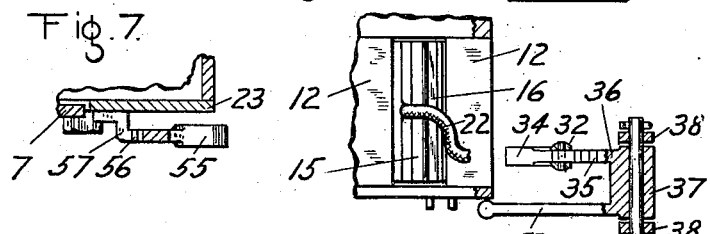
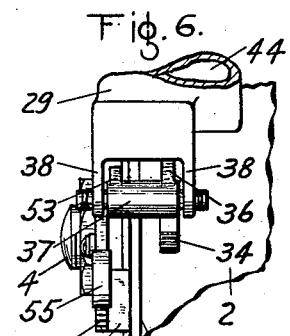
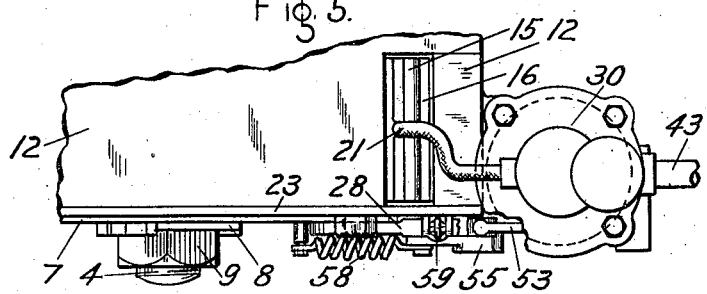
INVENTOR
CLYDE C. FARMER
BY Wm. M. Cody
ATTORNEY Patented Mar. 28, 1939

2,151,843

UNITED STATES PATENT OFFICE 2,151,843

FRICTION BRAKE

Clyde C. Farmer, Pittsburgh, Pa., assignor to The Westinghouse Air Brake Company, Wilmerding, Pa., a corporation of Pennsylvania Application April 17, 1936, Serial No. 74,830

24 Claims. (Cl. 188—153)

This invention relates to brake apparatus and more particularly to that type of brake apparatus having a tubular metallic diaphragm which is expansible either pneumatically or hydraulically to apply braking force to one or more brake shoes arranged to engage a rotatable member to be braked, such for instance as a brake drum.

It is well known that in brake apparatus, when a brake shoe is in its normal release position, there must be sufficient clearance space between the braking faces of the brake shoe and member to be braked to insure against any possibility of any part of the braking face of the brake shoe contacting the member to be braked so as to prevent undue wear of the brake shoe and member and to permit unrestrained rotation of the member.

In apparatus of the above mentioned type heretofore proposed it has been necessary, in effecting an application of the brakes, for the tubular metallic diaphragm to expand sufficiently to move the brake shoe from its normal release position into contact with the member to be braked and to then apply braking force to the brake shoe. It has been found that in effecting repeated application and releases of the brakes the expansion and contraction of the diaphragm sufficient to insure the movement of the brake shoe a distance equal to the minimum allowable clearance space between the shoe and member to be braked, soon fatigues the metal of the diaphragm so that it cracks and permits the pressure exerting medium, such as air or liquid, to leak from the diaphragm. It is obvious that when this occurs the damaged diaphragm must be replaced by a new one.

The principal object of the present invention is to provide an improved brake apparatus of the above type which will be free of the above mentioned objectionable features. This object is attained by providing means whereby, before expansion of the metallic diaphragm is permitted, the brake shoe is moved into contact with the brake drum, following which fluid under pressure is admitted to the diaphragm to cause it to function to apply braking force to the shoe. Since the brake shoe is in contact with the brake drum before fluid under pressure is admitted to the diaphragm, the expansion of the diaphragm to apply braking force to the shoe will be so slight that the possibilities of the diaphragm becoming damaged over a long period of time are reduced to a minimum.

Another object of the invention is to provide an improved brake apparatus of the above mentioned type with means operative automatically to adjust the apparatus to take up slack due to wear of the brake shoes or other movable parts. By reason of this the necessary clearance space between the braking faces of the brake shoe and brake drum, with the brakes released, will be maintained substantially uniform regardless of wear of the several parts of the apparatus.

Another object of the invention is to provide an improved brake apparatus of the above mentioned type with means automatically operative in effecting an application of the brakes to take up normal necessary slack between a brake shoe of the apparatus and a brake drum and to also take up slack due to wear of the brake shoe and other parts and to then apply braking force to the brake shoe.

Another object of the invention is to provide a brake apparatus of the above mentioned type, having a plurality of brake shoes arranged radially of a brake drum and having an expansible tube for applying braking force to each brake shoe, with means for simultaneously adjusting all of the brake shoes with relation to the brake drum to take up slack due to wear of the brake shoes or other parts of the apparatus.

A further object of the invention is to provide an improved and simplified piping arrangement for a brake of the above mentioned type having a plurality of brake shoes arranged radially of a member to be braked and a tubular diaphragm member for applying braking force to each of said shoes. This object is attained by connecting the tubular diaphragm members of the apparatus together in series. This arrangement materially simplifies the piping over that heretofore proposed in which each individual diaphragm member is directly connected to a main pressure supply pipe. It is well known that in brake apparatus of this type, the clearance space between the several parts thereof as well as the space to accommodate the apparatus as a whole, is necessarily very limited which renders it very difficult to assemble and install the apparatus. By connecting the diaphragms together in series considerable piping heretofore deemed necessary has been eliminated and as a consequence the apparatus will require considerably less space than that which has heretofore had to be provided.

Other objects and advantages will appear in the following more detailed description of the invention.

In the accompanying drawings, Fig. 1 is an end elevational view of a mechanism embodying the improved brake apparatus; Fig. 2 is a similar view with portions of the mechanism removed and portions being shown in section to more clearly illustrate certain features of the invention; Fig. 3 is a vertical sectional view of the brake apparatus taken on the line 3—3 of Fig. 1; Fig. 4 is a fragmentary sectional view of the apparatus as shown in Fig. 3 but has been enlarged to illustrate the tubular diaphragm in more detail than is possible in Fig. 3; Fig. 5 is a fragmentary plan view of the apparatus, illustrating the automatically operable take-up mechanism; Fig. 6 is a fragmentary end elevational view of the apparatus, illustrating the automatically operable take-up mechanism; and Figs. 7, 8 and 9 are sectional views of portions of the apparatus and are taken on the lines 7—7, 8—8 and 9—9, respectively, of Fig. 1.

In the accompanying drawings, the improved brake apparatus is illustrated in conjunction with an electric driving motor of a railway vehicle, but it will be understood that the invention is not to be limited to this for it is contemplated using the apparatus with brake drums carried by any rotatable elements.

As shown the electric motor may comprise a motor frame or housing 1 which may be mounted on a railway vehicle in the usual manner. Secured to one end of the motor housing 1 is a bearing member 2 having an outwardly extending bearing portion 3 in which one end of the armature shaft 4 of the motor is journalled. The shaft 4 extends beyond the outer end of the bearing portion 3 and, adjacent the outer end of said bearing portion, has secured thereto, so as to rotate therewith, a brake drum or wheel 5. The outer end portion 6 of the shaft 4 is reduced in diameter and has rockably mounted thereon an adjusting member or plate 7 which is maintained in position longitudinally of the shaft by means of a washer 8 which is engaged by a nut 9 having screw-threaded connection with the outer end of the shaft and by means of an annular shoulder 10 formed on the shaft by the reduction in the diameter of the outer end portion thereof, the washer being in sliding engagement with the outer face of the plate 7 and the shoulder 10 being in sliding engagement with the end of an inwardly extending flange or boss 11 of the plate.

Extending outwardly from the bearing member 2 and preferably integrally carried thereby are a plurality of lugs 12 which are arranged about the braking wheel 5 and which are spaced some distance away from the periphery of the braking wheel. In the present embodiment of the invention there are four of these lugs which are arranged in rectangular form as shown in Fig. 2. The top and bottom lugs are arranged parallel with the transverse center line of the shaft 4 and the side lugs are arranged parallel with the vertical center line of the shaft.

Mounted in the space between the periphery of the braking wheel 5 and each of the lugs 12 is a brake shoe 13 which may have secured thereto in any desired manner a brake lining 14. Operatively engaging the back of the brake shoe is an expansible and contractible mechanism comprising a diaphragm 15 which is preferably made of metal and which is normally in the form of a flattened expansible tube, which, as shown in Fig. 2, is folded or looped to provide three expansible layers of tube. Between the adjacent layers of tube are follower or spacer plates 16.

Interposed between and operatively engaging the outer layer of the diaphragm 15 and the inner surface of the adjacent lug 12 is a wedge mechanism comprising a wedge member 17 which is movable radially relative to the drum or wheel 5 which is in operative engagement with the outer layer of the diaphragm 15, and also comprising a longitudinally movable wedge member 18 which is in operative sliding engagement with the lug 12 and wedge member 17, said member 18 when moved longitudinally, cooperating with the wedge member 17 to move the diaphragm 15, follower plate 16 and brake shoe toward the braking wheel 5. The brake shoe is guided in its movement toward and away from the braking wheel 5 by spaced stationary lugs 19 which may be integral with the bearing member 2. Each lug 19 forms a guide for the ends of two shoes. The lugs 19 also serve to prevent the brake shoes from moving in the direction of travel of the braking wheel 5 when the shoes are in braking engagement with the wheel.

Interposed between and operatively engaging the adjacent ends of adjacent brake shoes is a spring 20. When four brake shoes are employed there will be four springs 20 which normally act to maintain the brake shoes in their release position and which act to move the brake shoes to their release position when, following an application of the brakes, a release of the brakes is being effected.

As shown in Fig. 2 of the drawings, the open end of the outer layer of one diaphragm 15 is connected to a flexible supply pipe or hose 21 and the diaphragms are connected together in series by means of short sections of flexible pipe or hose 22. The end of the outer layer of the diaphragm 15 located on the right hand side of the apparatus is closed against the flow of fluid therefrom to the atmosphere in any desired manner.

The brake shoes 13, wedge mechanisms and diaphragms 15 are covered by a plate 23 which rests on the ends of the lugs 12 and 19 and is secured to the bearing member 2 by means of bolts 24, said plate having a central opening for the accommodation of the rockable adjusting member 7.

Each of the longitudinally movable wedge members 18 is provided with an outwardly extending lug 25 which extends through a narrow slot 26 in the cover plate 23 and which at its outer end is operatively engaged by the forked outer end of a driving member which is rigidly secured to the adjusting member 7. In the present embodiment of the invention there are four of these driving members, three of which are identical with each other and are therefore identified by the reference character 27. The fourth differs somewhat from the others as will be apparent from an inspection of Fig. 2 and is identified by the reference character 28.

Located at the right hand side of the apparatus and integrally carried by the bearing member 2 is a cylinder 29 having a pressure head 30 secured thereto and containing a piston 31 having a piston stem 32 which extends through an opening in the non-pressure head 33 of the cylinder and which has pivotally mounted on its outer end a gravity controlled ratchet pawl 34 which is adapted to engage ratchet teeth 35 formed on an arm 36 of a member 37 rockably carried by spaced lugs 38 depending from the cylinder 29.

At one side of the piston 31 is a chamber 39 which is connected through a passage 40, a chamber 41 and a passage 42 to an application and release pipe 43 through which fluid under pressure is adapted to be supplied and released to effect the application and release of the brakes, the pressure of fluid in said pipe 43 being controlled by any desired means.

At the other side of the piston 31 is a chamber 44 which is connected to the atmosphere through a passage 45 in the non-pressure head 33 of the cylinder and which contains a spring 45 that acts to normally maintain the piston in its outermost position as shown in Fig. 2.

The lower end of the piston stem 32 is provided with a longitudinally extending slot 46 for the reception of a pin 47 carried by the non-pressure head 33 of the cylinder, said pin being adapted to prevent rotation of the piston stem and thereby the piston 31 and ratchet pawl 34.

Mounted in the pressure head 30 of the cylinder is a valve piston 48 which is adapted to control communication between the chamber 41 and a passage 49 leading to the flexible pipe 21, said valve, under the influence of a spring 50, normally closing the communication.

Leading from the passage 49 is a release passage 51 which by-passes the valve piston 48 and is connected to the chamber 41. Interposed in this passage is a ball check valve 52 which prevents flow of fluid from the chamber 41 to the passage 49.

The rockable member 37 is provided with an integral arm 53 which at its outer end operatively engages the forked end of the member 28 carried by the rockable adjusting plate 7.

The member 28 intermediate its ends is provided with a pin or lug 54 on which the upper end of a latch member 55 is pivotally mounted, the opening in the member through which the lug 54 extends being in the form of a slot 60 to permit a limited movement of the member 28 relative to the latch member. The lower end of the latch member 55 is adapted to engage ratchet teeth 56 formed on a ratchet plate 57 which is rigidly secured to the cover plate 23 and is adapted to be held in such engagement by the action of a spring 58 which, in the present embodiment of the invention, has one end anchored to the plate 7 and the other end to the latch member. When the latch member is in engagement with the teeth of the ratchet plate the member cannot be moved upwardly due to the teeth of the ratchet plate 57 being directed downwardly at an angle. However, the member can be moved downwardly since the member is free to ratchet over the teeth of the ratchet plate in this direction.

Operatively connected to the cover plate 7 and the member 28 is a spring 59 which at all times tends to rotate the member and consequently the adjusting plate 23 in a counterclockwise direction.

*Operation of apparatus to effect an application of the brakes*

When it is desired to effect an application of the brakes, fluid under pressure is supplied to the application and release pipe 43 and consequently to the chambers 41 and 39. Fluid under pressure in chamber 39 causes the piston 31 to move inwardly from the position in which it is shown in Fig. 2. The piston as it is thus moved, acting through the medium of the stem 32, pawl 34 and teeth 35 of arm 36, causes the member 37 and thereby the arm 53 to be rocked in a counterclockwise direction. The arm 53 as it moves in this direction drives the member 28 and thereby the adjusting plate 7 and members 27 in a clockwise direction. The members 27 and 28 as they are thus moved, act through the medium of the lugs 25 to shift the wedge members 18 in the direction of their length, causing the wedge members 17, diaphragms 15 and brake shoes 13 to move inwardly toward the braking wheel or drum 5. Now when the brake shoe linings 14 engage the braking wheel 5, the movement of the brake shoes and consequently the several parts of the mechanism for moving the shoes will be stopped due to such engagement.

It will here be noted that due to the lost motion connection between the driving member 28 and the upper end of the latch member 55, the member 28 will not transmit downward movement to the latch member until after the pin or lug 54 carried by the member 28 has been moved into engagement with the end of the slot 60. If, prior to the movement of the brake shoes toward the wheel 5, there is the desired clearance space between the braking faces of the linings and wheel, the member 28 will, when an application of the brakes is initiated, come to a stop at substantially the same time as the lug 54 reaches the lower end of the slot, so that the latch member 55 will not be moved downwardly. However, when the clearance space between the linings and wheel 5 is excessive the latch member 55 will be moved downwardly as will hereinafter more fully appear.

When, after the brake shoe linings have been moved into engagement with the braking wheel 5, the pressure of fluid in chamber 41 has been increased sufficiently to unseat the valve piston 48 against the opposing pressure of the spring 50, fluid under pressure flows from pipe 43 and chamber 41 through passage 49 and pipe 21 to the diaphragms 15, causing the diaphragms to expand and thereby transmit braking power to all of the brake shoes simultaneously. The expansion of the diaphragms will be slight since the shoes are held in close engagement with the braking wheel 5 by the take-up cylinder mechanism at the time fluid under pressure is admitted to the diaphragms.

*Release of the brakes*

When it is desired to release the brakes, the application and release pipe 43 is connected through the medium of the brake valve device to the atmosphere. Fluid under pressure now flows from the diaphragms 15 to the atmosphere by way of flexible connection 21, passage 49, past the unseated valve piston 48, chamber 41, passage 42 and pipe 43. When the pressure of fluid in chamber 41 has been decreased to such an extent that the spring 50 acts to seat the valve piston 48, the release flow of fluid under pressure from the diaphragms continues by way of the passage 51 which by-passes the valve piston. At the same time as fluid under pressure is being vented from the diaphragms 15 fluid under pressure is being vented from the piston chamber 39 of the take-up cylinder device by way of passage 40 and chamber 41.

When the pressure of fluid in piston chamber 39 has been reduced to a low degree the action of the springs 45 and 59 causes the piston 31 to move outwardly to its normal position in which it is shown in Fig. 2, the spring 45 acting directly on the piston and the spring 59 acting through the medium of the member 28, arm 53 of the member 37, arm 36, teeth 35 of the arm 36, pawl 34 and piston stem 32.

It will be noted that in releasing the brakes the spring 59 acts to move the member 28 and thereby the adjusting plate 7 and attached members 27 in a counter-clockwise direction and that the members 28 and 27 act, through the medium of the lugs 25 to shift the wedge members back to their normal release position in which position they are shown in Fig. 2.

As the wedge members 18 are thus being moved the release springs 20 act to move the brake shoes 13, diaphragms 15, follower plates 16 and wedge members 17 to their normal release positions.

At the time the wedge members are being moved toward brake release position, the pressure of fluid in the diaphragms will have been reduced to such a low degree that the pressure of the release springs 20 acting through the medium of the brake shoes 13 will prevent the reducing fluid pressure from expanding the diaphragms.

Automatic wear take-up operation

When, due to wear of the brake linings 14 of the brake shoes 13 or of any other parts of the apparatus, the member 28, in initiating an application of the brakes, continues to move in a clockwise direction after the lug 54 has traversed the slot and is in engagement with the latch member 55, the latch member will be moved downwardly by the lug out of engagement with one tooth into the plane of the next tooth and will be immediately drawn into engagement with said next tooth by the action of the spring 58.

The latch member 55, since it has been moved downwardly to a new position and is maintained in this position against upward movement, will when the brakes are being released, prevent the member 28 and thereby the adjusting plate 7, member 27, wedge members 18 and rockable member 37 from being moved to the positions from which they started when the application of the brakes was initiated. From this it will be seen that the brake shoe travel is maintained substantially uniform regardless of wear of the brake shoe linings 14.

After the member 37 has been brought to a stop as just described, the piston 31 continues to move outwardly to its normal release position and as it moves, the pawl 34 moves out of engagement with one tooth 35 of the arm 36 and then into engagement with the next higher tooth 35. By reason of this adjustment, the maximum volumetric capacity of the take-up piston chamber 39 is maintained uniform regardless of the adjustment of the apparatus to compensate for wear. This feature not only conserves fluid but also insures against undue delay in effecting either the application or release of the brakes.

It will be apparent from the foregoing description that as the brake shoe linings 14 wear away the take-up mechanism functions to adjust the brake shoes to provide a uniform clearance space between the faces of the linings and the peripheral braking face of the wheel or drum 5 when the brake shoes are in their full release position.

When it is desired to reline the brake shoes 13, the latch member 55 and pawl 34 are moved manually out of engagement with the member 57 and arm 36, respectively, and when this has been done the spring 59 acts to rotate the member 28 and thereby the plate 7 and members 27 in a counter-clockwise direction, the members 27 and 28 acting through the medium of the lugs 25 to move the wedge members back to their original position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a rotatable member to be braked, a plurality of brake elements arranged about said member and movable into braking engagement therewith, an expansible metallic tube associated with each of said elements responsive to fluid under pressure to apply pressure to the element to effect an application of the brakes, and means operative to simultaneously adjust the position of all of said elements relative to said member to compensate for wear of said elements to insure a substantially uniform movement of said element relative to said member in releasing each application of the brakes.

2. In a fluid pressure brake, in combination, a rotatable member to be braked, a plurality of brake elements arranged about said member and movable into braking engagement therewith, a plurality of fluid pressure responsive expansible metallic tubes connected together in series and each being operative when fluid under pressure is supplied thereto to urge an associated brake element into braking engagement with said member, and means operative to simultaneously adjust all of said elements and tubes relative to said member to compensate for wear of said elements to insure a substantially uniform movement of said elements and tubes relative to said member in releasing each application of the brakes.

3. In a fluid pressure brake, in combination, a rotatable member to be braked, a plurality of brake elements arranged about said member and movable into braking engagement therewith, a plurality of fluid pressure responsive expansible metallic tubes connected together in series and each being operative when fluid under pressure is supplied thereto to urge an associated brake element into braking engagement with said member, means associated with each tube and element and operative to adjust the position of said element relative to said member to compensate for wear of the element to insure a substantially uniform movement of said element relative to said member in releasing each application of the brakes, and a rockable member operative to simultaneously actuate all of said means.

4. In a fluid pressure brake, in combination, a casing, a rotatable member to be braked, a plurality of braking elements adapted to frictionally engage said member, a plurality of expansible tubes each being responsive to fluid under pressure for urging one of said elements into frictional engagement with said member, a plurality of adjusting mechanisms operative to adjust the position of said elements relative to said member to insure a uniform release movement of the elements relative to said member regardless of wear of the elements or member, each of said mechanisms effecting the adjustment of one tube and one element, a plate secured to said casing and covering said braking elements, tubes and adjusting mechanism, a member included in each of said adjusting mechanisms through the medium of which the adjusting mechanism is adapted to be actuated, each member extending through the cover plate, and rockable means cooperating with the outer end of each member and operative to simultaneously actuate all of the members.

5. In a fluid pressure brake, in combination, a member to be braked, a brake element normally spaced away from said member and movable into braking engagement therewith, fluid pressure responsive means operative upon a predetermined increase in fluid pressure to move said element into engagement with said member, an expansible tubular member interposed between said fluid pressure responsive means and element movable with said means and element and operative by fluid under pressure to urge said element into closer engagement with said member, and valve means operative upon a predetermined increase in the pressure of fluid supplied to said fluid pressure responsive means to supply fluid under pressure to said tubular member only when the pressure of fluid is increased above that required to effect the operation of said fluid pressure responsive means.

6. In a fluid pressure brake, a member to be braked, a brake element normally spaced away from said member and movable into braking engagement therewith, fluid pressure responsive means operative to move said element into contact with said member, means movable with said element and operative by fluid under pressure to exert a braking force on said element, and fluid pressure controlled valve means separate from said fluid pressure responsive means for delaying the supply of fluid under pressure to said means.

7. In a fluid pressure brake, in combination, a member to be braked, a brake element normally spaced away from said member and movable into frictional engagement therewith, fluid pressure responsive means operative upon an increase in fluid pressure for effecting the movement of said element into engagement with said member and operative upon a decrease in fluid pressure for effecting the movement of said element out of engagement with said member, said fluid pressure responsive means comprising a piston, a mechanism controlled by said piston for effecting the movement of said element, means operative in effecting an application of the brakes to automatically adjust said mechanism to take up slack, and a ratchet mechanism providing a driving connection between said piston and mechanism when the piston is operated in effecting an application of the brakes and providing for lost motion between the piston and mechanism as the piston makes its traverse in releasing the brakes following a slack take-up adjustment of the mechanism.

8. In a brake mechanism, in combination, a member to be braked, a brake element adapted to be moved into braking engagement with said member, means operative upon an increase in fluid pressure to move said element into engagement with said member and to take up slack as it is being operated, a fluid pressure responsive power producing motor movable with said element adapted when fluid under pressure is supplied thereto to exert braking force on said element, and valve means separate from the first mentioned means for delaying the admission of fluid under pressure to the fluid pressure responsive motor until the increase in fluid pressure exceeds that required to effect the operation of the first mentioned means.

9. In a fluid pressure brake, in combination, a rotatable member to be braked, a brake element adapted to engage said member, a fluid pressure responsive expansible tube associated with said element, means operative in applying the brakes for moving said element and tube so that the element engages said member without expanding said tube, and means separate from the first mentioned means operative for then admitting fluid under pressure to said tube to apply pressure to said element while in engagement with said member.

10. In a fluid pressure brake, in combination, a rotatable member to be braked, a brake element adapted to engage said member, a fluid pressure responsive expansible tube associated with said element, mechanism operated by fluid under pressure for effecting movement of said element and tube so that said element engages said member without the tube being expanded, and means operative upon a predetermined increase in the pressure of fluid supplied to said mechanism for supplying fluid under pressure to said tube to apply said element with pressure to said member.

11. In a fluid pressure brake, in combination, a rotatable member to be braked, a brake element adapted to engage said member, mechanical means operative in effecting an application of the brakes to move said element to take up slack between the element and member, and a partially collapsed metal tube cooperating with said means expansible by fluid under pressure to apply braking pressure to said element when the operating force applied to the means exceeds that normally required to effect the operation of the means.

12. In a fluid pressure brake, in combination, a rotatable member to be braked, a brake element adapted to engage said member, mechanically expansible means operative in effecting an application of the brakes to move said element to take up slack between said element and member, and fluid pressure expansible means operative to apply braking pressure to said element when the operating force applied to said mechanically expansible means exceeds that normally required to effect the operation of the mechanically expansible means.

13. In a fluid pressure brake, in combination, a rotatable member to be braked, a brake element adapted to engage said member, mechanically expansible means operative in effecting an application of the brakes to move said element to take up slack between said element and member, and fluid pressure expansible means cooperating with said means to apply braking pressure to said element when the operating force applied to said mechanically expansible means exceeds that normally required to effect the operation of the mechanically expansible means.

14. In a fluid pressure brake, in combination, a rotatable member to be braked, a plurality of brake elements arranged about said member and being normally spaced a predetermined distance therefrom, said elements being movable from their normal position into engagement with said member, mechanism operative in effecting an application of the brakes to move all of said elements into engagement with said member, an expansible tube associated with each of said elements responsive to fluid under pressure in effecting an application of the brakes to force the element into closer engagement with said member, said mechanism being adapted, in effecting a subsequent release of the brakes, to effect the movement of all of said elements out of engagement with said member, and means automatically adjusted while the elements are in engagement with said member for limiting the release movement of said elements to said predetermined distance regardless of wear of the elements.

15. In a fluid pressure brake, in combination, a rotatable member to be braked, a plurality of brake elements arranged about said member and being normally spaced a predetermined distance therefrom, said elements being movable from their normal position into engagement with said member, mechanism operative in effecting an application of the brakes to move all of said elements into engagement with said member, an expansible tube associated with each of said elements responsive to fluid under pressure in effecting an application of the brakes to force the element into closer engagement with said member, said mechanism being adapted, in effecting a subsequent release of the brakes, to effect the movement of all of said elements out of engagement with said member, and means included in said mechanism automatically adjustable according to wear of the elements for limiting the release movement of the elements relative to said member to said predetermined distance.

16. In a fluid pressure brake, in combination, a rotatable member to be braked, a plurality of brake elements arranged about said member and being normally spaced a predetermined distance therefrom, said elements being movable from their normal position into engagement with said member, mechanism operative in effecting an application of the brakes to move all of said elements into engagement with said member, an expansible tube associated with each of said elements responsive to fluid under pressure in effecting an application of the brakes to force the element into closer engagement with said member, said mechanism being adapted, in effecting a subsequent release of the brakes, to effect the movement of all of said elements out of engagement with said member, and means automatically adjustable to insure a substantially uniform release movement of the elements relative to said member following each brake application.

17. In a fluid pressure brake, in combination, a rotatable member to be braked, a brake element adapted to engage said member, mechanically expansible means comprising a pair of slidably cooperating wedge members operative, in effecting an application of the brakes, to move said element into engagement with said member, means interposed between and engaging one of said wedge members and said element operative by fluid under pressure to apply braking pressure to said element.

18. In a fluid pressure brake, in combination, a rotatable member to be braked, a brake element adapted to engage said member, mechanically expansible means comprising a pair of relatively movable wedge members adapted to cooperate with each other in effecting an application of the brakes to move said element into engagement with the member to be braked, means for moving said wedge members, and means engaging one of said wedge members and said element and operative by fluid under pressure to apply braking pressure to said element.

19. In a brake mechanism, in combination, a rotatable member to be braked, a non-rotatable housing surrounding said member, a plurality of brake elements within said housing radially arranged with relation to said member and movable into engagement with said member, mechanically expansible means and fluid pressure expansible means within said housing operative successively for forcing said elements into braking engagement with said member, fluid pressure responsive means for actuating said mechanically expansible means, and means responsive to fluid under pressure to admit fluid under pressure to said fluid pressure expansible means.

20. In a brake mechanism, in combination, a rotatable member to be braked, a non-rotatable housing surrounding said member, a plurality of brake elements within said housing radially arranged with relation to said member and movable into engagement with said member, mechanically expansible means and fluid pressure expansible means within said housing operative successively for forcing said elements into braking engagement with said member, fluid pressure responsive means for actuating said mechanically expansible means, a spring, and a valve subject to the opposing pressures of said spring and a chamber and operative upon a predetermined increase in the pressure of fluid in said chamber for admitting fluid under pressure to said fluid pressure expansible means, and means responsive to a pressure less than that required to effect the operation of said valve for admitting fluid under pressure to said fluid pressure expansible means for actuating said mechanically expansible means.

21. In a brake mechanism, in combination, a rotatable member to be braked, a non-rotatable housing surrounding said member, a plurality of brake elements within said housing radially arranged with relation to said member and movable into engagement with said member, mechanically expansible means and fluid pressure expansible means within said housing operative successively for forcing said elements into braking engagement with said member, fluid pressure responsive means for actuating said mechanically expansible means, a chamber to which fluid under pressure is adapted to be admitted to effect an application of the brakes, means responsive to a predetermined increase in the pressure of fluid in said chamber to actuate said mechanically expansible means, and means responsive to a pressure in said chamber in excess of that required to actuate the fluid pressure responsive means for admitting fluid under pressure to said fluid pressure expansible means.

22. In a brake mechanism, in combination, a rotatable member to be braked, a non-rotatable housing surrounding said member, a plurality of brake elements within said housing radially arranged with relation to said member and movable into engagement with said member, mechanically expansible means and fluid pressure expansible means within said housing adapted to cooperate with said housing and elements and with each other to force said elements into braking engagement with said member, fluid pressure responsive means operable to actuate said mechanically expansible means, and valve means operable by fluid under pressure following the operation of said fluid pressure responsive means for admitting fluid under pressure to said fluid pressure expansible means.

23. In a brake mechanism, in combination, a rotatable member to be braked, a non-rotatable housing surrounding said member, a brake element within said housing and movable into engagement with said member, mechanically expansible means within and engaging said housing operative to move said element into engagement with said member, fluid pressure expansible means interposed between and engaging said mechanically expansible means and said element operable to exert braking pressure on said element, fluid pressure operable means for actuating said mechanically expansible mechanism, and means operative separately from the operation of said fluid pressure operable means for admitting fluid under pressure to said fluid pressure expansible means.

24. In a brake mechanism, in combination, a rotatable member to be braked, a non-rotatable housing surrounding said member, a brake element within said housing and movable into engagement with said member, mechanically expansible means within and engaging said housing operative to move said element into engagement with said member, fluid pressure expansible means engaging said mechanically expansible means and operable to exert braking pressure on said element, fluid pressure responsive means for actuating said mechanically expansible mechanism, and means operative separately from the fluid pressure responsive means and by fluid under pressure supplied to the fluid pressure responsive means for admitting fluid under pressure to said fluid pressure expansible means.

CLYDE C. FARMER.